US010825452B2

(12) United States Patent
Ye et al.

(10) Patent No.: US 10,825,452 B2
(45) Date of Patent: Nov. 3, 2020

(54) METHOD AND APPARATUS FOR PROCESSING VOICE DATA

(71) Applicant: BAIDU ONLINE NETWORK TECHNOLOGY (BEIJING) CO., LTD, Beijing (CN)

(72) Inventors: Can Ye, Beijing (CN); Yiyu Peng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 29 days.

(21) Appl. No.: 16/170,939

(22) Filed: Oct. 25, 2018

(65) Prior Publication Data

US 2019/0066665 A1 Feb. 28, 2019

Related U.S. Application Data

(63) Continuation of application No. 15/615,512, filed on Jun. 6, 2017, now Pat. No. 10,140,984.

(30) Foreign Application Priority Data

Nov. 18, 2016 (CN) .......................... 2016 1 1031726

(51) Int. Cl.
*G10L 15/20* (2006.01)
*G10L 17/04* (2013.01)
(Continued)

(52) U.S. Cl.
CPC .............. *G10L 15/20* (2013.01); *G10L 15/02* (2013.01); *G10L 17/005* (2013.01); *G10L 17/04* (2013.01); *G10L 17/08* (2013.01)

(58) Field of Classification Search
CPC combination set(s) only.
See application file for complete search history.

(56) References Cited

U.S. PATENT DOCUMENTS 7,995,713 B2 * 8/2011 Fratti ...................... H04M 3/56 379/88.02
9,858,931 B2 1/2018 Williams
(Continued)

FOREIGN PATENT DOCUMENTS

CN 1941080 A 4/2007
CN 104219050 A 12/2014
CN 105869645 A 8/2016

*Primary Examiner* — Akelaw Teshale
(74) *Attorney, Agent, or Firm* — Nixon Peabody LLP

(57) ABSTRACT

A method and an apparatus for processing voice data. A specific implementation of the method includes: receiving voice data sent by a user terminal; extracting a voiceprint characteristic vector in the voice data; matching the voiceprint characteristic vector with a registered voiceprint vector prestored by the user, and generating a matching degree between the voiceprint characteristic vector and the registered voiceprint vector; determining whether the matching degree is greater than or equal to a preset update threshold; and updating the registered voiceprint vector by using the voiceprint characteristic vector and the voice data in response to determining that the matching degree is greater than or equal to the preset update threshold. This implementation enhances accuracy of a registered voiceprint vector of a user.

19 Claims, 6 Drawing Sheets

(51) Int. Cl.
*G10L 17/08* (2013.01)
*G10L 15/02* (2006.01)
*G10L 17/00* (2013.01)

(56) References Cited

U.S. PATENT DOCUMENTS

| | | | | |
|---|---|---|---|---|
| 9,870,776 | B2 * | 1/2018 | Jaiswal | G10L 17/005 |
| 2003/0182119 | A1 * | 9/2003 | Junqua | G10L 15/24 704/246 |
| 2005/0185779 | A1 | 8/2005 | Toms | |
| 2006/0188076 | A1 * | 8/2006 | Isenberg | H04M 3/385 379/88.02 |
| 2007/0198257 | A1 * | 8/2007 | Zhang | G10L 17/20 704/233 |
| 2007/0219801 | A1 * | 9/2007 | Sundaram | G10L 17/04 704/270 |
| 2014/0278414 | A1 * | 9/2014 | Miki | G10L 17/04 704/244 |
| 2015/0067822 | A1 * | 3/2015 | Randall | G06F 21/32 726/17 |
| 2017/0092276 | A1 | 3/2017 | Sun | |

* cited by examiner

METHOD AND APPARATUS FOR PROCESSING VOICE DATA

CROSS-REFERENCE TO RELATED APPLICATION

This application is a continuation of U.S. patent application Ser. No. 15/615,512, filed Jun. 6, 2017, now allowed, which is related to and claims the priority from Chinese Application No. 201611031726.7, filed on Nov. 18, 2016, entitled "Method and Device for Processing Voice Data," the entire disclosures of which are incorporated herein by reference in their entireties.

TECHNICAL FIELD

The present disclosure relates to the field of computer technologies, particularly to the field of data processing technologies, and more particularly, to a method and an apparatus for processing voice data.

BACKGROUND

In recent years, as an emerging means for biological recognition, voiceprint recognition has received great attention due to the security and convenience it provides. Voiceprint recognition is used to recognize and authenticate a person's identity utilizing unique information contained in each person's voice based on physiological differences in sizes and forms in the vocal organs of different persons, such as lungs, trachea, vocal cords, oral cavities, nasal cavities and pharyngeal cavities. However, in reality, voice acoustic characteristics of each person are neither absolute nor constant, but are jointly affected by external factors such as environments and used devices, and by intrinsic factors such as individual physical condition, emotional fluctuation and speech style change. In addition, researches have shown that human voice acoustic characteristics also may change with age. Thus, tracing dynamic changes of voiceprint characteristics of a user so that a voiceprint model of the user can be adaptively updated according to newly added voice samples, is of great significance to enhance the functionalities of a voiceprint recognition system.

At present, when a user is authenticated, the voiceprint model generated based on the voice data input at the time of user registration is generally used. However, this model cannot be adaptively updated, and thus this method for authenticating the user may lead to incorrect authentication result as time goes on.

SUMMARY

An objective of the present disclosure is to provide an improved a method and an apparatus for processing voice data, in order to solve the technical problem mentioned in the foregoing Background section.

In a first aspect, the present disclosure provides a method for processing voice data. The method comprises: receiving voice data sent by a user terminal; extracting a voiceprint characteristic vector in the voice data; matching the voiceprint characteristic vector with a registered voiceprint vector prestored by the user, and generating a matching degree between the voiceprint characteristic vector and the registered voiceprint vector; determining whether the matching degree is greater than or equal to a preset update threshold; and updating the registered voiceprint vector by using the voiceprint characteristic vector and the voice data in response to determining that the matching degree is greater than or equal to the preset update threshold.

In some embodiments, the extracting a voiceprint characteristic vector in the voice data comprises: importing the voice data into a pre-trained universal background model for mapping to obtain an intermediate vector; and performing a characteristic transformation on the intermediate vector to obtain the voiceprint characteristic vector.

In some embodiments, before matching the voiceprint characteristic vector with a registered voiceprint vector prestored by the user, the method further comprises a step of generating the registered voiceprint vector, comprising: acquiring a preset amount of registered voice data inputted by the user; importing the preset amount of registered voice data into a pre-trained universal background model for mapping to obtain a preset number of equal-length intermediate vectors; performing a characteristic transformation on the preset number of equal-length intermediate vectors to obtain a preset number of registered voiceprint characteristic vectors; and fusing the preset number of registered voiceprint characteristic vectors to generate the registered voiceprint vector of the user.

In some embodiments, the updating the registered voiceprint vector by using the voiceprint characteristic vector and the voice data comprises: acquiring the amount of registered voice data inputted by the user and each voiceprint characteristic vector prestored by the user; and updating the registered voiceprint vector according to each voiceprint characteristic vector prestored by the user, the amount of voice data prestored by the user, the amount of the registered voice data and the registered voiceprint vector.

In some embodiments, the updating the registered voiceprint vector according to the each voiceprint characteristic vector prestored by the user, the amount of voice data prestored by the user, the amount of the registered voice data and the registered voiceprint vector comprises: carrying out a data standardization operation on the each voiceprint characteristic vector prestored by the user, and carrying out a summing operation on the vector subject to the data standardization operation to obtain sum of the voiceprint characteristic vector prestored by the user; multiplying the amount of the registered voice data by the registered voiceprint vector to obtain a product of the registered voiceprint vector; and calculating a vector sum of the sum of the voiceprint characteristic vectors and the product of the registered voiceprint vector, calculating a amount sum of the amount of the voice data prestored by the user and the amount of the registered voice data, and dividing the vector sum by the number sum to obtain the updated registered voiceprint vector.

In some embodiments, after updating the registered voiceprint vector, the method comprises: deleting the voice data prestored by the user.

In some embodiments, acquiring a preset amount of registered voice data inputted by the user comprises: acquiring the voice data prestored by the user and relevant information of the voice data, wherein the relevant information comprises an input time point of the voice data; deleting voice data whose input time point is earlier than a preset time division point, and determining the voice data after deletion as the registered voice data.

In some embodiments, acquiring a preset amount of registered voice data inputted by the user further comprises: generating at least one cluster of the stored voice data by clustering the voice data stored by the user by using a clustering algorithm; acquiring a center point of each cluster; calculating a distance between each of the stored voice data and the center point of the cluster where the each of the stored voice data is by using a distance algorithm; and deleting the voice data whose distance is greater than a preset distance threshold, and determining the voice data after deletion as the registered voice data.

In some embodiments, the relevant information further comprises at least one of: an acquisition device type of the voice data and an input site of the voice data; and after generating at least one cluster of the stored voice data, the method further comprises: acquiring voice data in each cluster and relevant information of the voice data in the each cluster; and regenerating each registered voiceprint vector of the user by using the voice data in the each cluster, and generating relevant information of the each registered voiceprint vector according to the relevant information of the voice data in the each cluster.

In some embodiments, after receiving voice data sent by a user terminal, the method further comprises: acquiring the relevant information of the voice data; and matching the voiceprint characteristic vector with the registered voiceprint vector of the user comprises: selecting a registered voiceprint vector according to a matching degree between the relevant information of the voice data and the relevant information of the each registered voiceprint vector; and matching the voiceprint characteristic vector with the selected registered voiceprint vector.

In some embodiments, after the generating a matching degree between the voiceprint characteristic vector and the registered voiceprint vector, the method further comprises: determining whether the matching degree is greater than or equal to a preset success threshold; and determining that the user is succeeded in authentication and executing an operation corresponding to the succeeded authentication in response to determining that the matching degree is greater than or equal to the preset success threshold.

In a second aspect, the present disclosure provides an apparatus for processing voice data. The apparatus comprises: a receiving unit, configured to receive voice data sent by a user terminal; an extracting unit, configured to extract a voiceprint characteristic vector in the voice data; a matching unit, configured to match the voiceprint characteristic vector with a registered voiceprint vector prestored by the user, and generate a matching degree between the voiceprint characteristic vector and the registered voiceprint vector; a first determining unit, configured to determine whether the matching degree is greater than or equal to a preset update threshold; and an updating unit, configured to update the registered voiceprint vector by using the voiceprint characteristic vector and the voice data in response to determining that the matching degree is greater than or equal to the preset update threshold.

In some embodiments, the extracting unit comprises: a mapping module, configured to import the voice data into a pre-trained universal background model for mapping to obtain an intermediate vector; and a transforming module, configured to perform a characteristic transformation on the intermediate vector to obtain the voiceprint characteristic vector.

In some embodiments, the apparatus further comprises a generating unit, comprising: an acquiring module, configured to acquire a preset amount of registered voice data inputted by the user; a mapping module, configured to import the preset amount of registered voice data into a pre-trained universal background model for mapping to obtain a preset number of equal-length intermediate vectors; a transforming module, configured to perform a characteristic transformation on the preset number of equal-length intermediate vectors to obtain a preset number of registered voiceprint characteristic vectors; and a fusing module, configured to fuse the preset number of registered voiceprint characteristic vectors to generate the registered voiceprint vector of the user.

In some embodiments, the updating unit comprises: an acquiring module, configured to acquire the amount of registered voice data inputted by the user and each voiceprint characteristic vector prestored by the user; and an updating module, configured to update the registered voiceprint vector according to the each voiceprint characteristic vector prestored by the user, the amount of voice data prestored by the user, the amount of the registered voice data and the registered voiceprint vector.

In some embodiments, the updating module comprises: a first calculating submodule, configured to carry out a data standardization operation on the each voiceprint characteristic vector prestored by the user, and carry out a summing operation on the vector subject to the data standardization operation to obtain the sum of the voiceprint characteristic vectors prestored by the user; a second calculating submodule, configured to multiply the amount of the registered voice data by the registered voiceprint vector to obtain a product of the registered voiceprint vector; and an updating submodule, configured to calculate a vector sum of the sum of the voiceprint characteristic vectors and the product of the registered voiceprint vector, calculate an amount sum of the amount of the voice data prestored by the user and the amount of the registered voice data, and divide the amount sum by the vector sum to obtain the updated registered voiceprint vector.

In some embodiments, the updating unit is further configured to delete the voice data prestored by the user.

In some embodiments, the acquiring module comprises: a first acquiring submodule, configured to acquire the voice data prestored by the user and relevant information of the voice data, wherein the relevant information comprises an input time point of the voice data; and a first deleting submodule, configured to delete voice data whose input time point is earlier than a preset time division point, and determine the voice data after deletion as the registered voice data.

In some embodiments, the acquiring module comprises: a generating submodule, configured to generate at least one cluster of the stored voice data by clustering the voice data stored by the user by using a clustering algorithm; a second acquiring submodule, configured to acquire a center point of each cluster; a calculating submodule, configured to calculate a distance between each of the stored voice data and the center point of the cluster where the each of the stored voice data is by using a distance algorithm; and a second deleting submodule, configured to delete the voice data whose distance is greater than a preset distance threshold, and determine the voice data after deletion as the registered voice data.

In some embodiments, the relevant information further comprises at least one of: an acquisition device type of the voice data and an input site of the voice data; and the apparatus further comprises: a first acquiring unit, configured to acquire voice data in each cluster and relevant information of the voice data in the each cluster; and a regenerating unit, configured to regenerate each registered voiceprint vector of the user by using the voice data in the each cluster, and generate relevant information of the each registered voiceprint vector according to the relevant information of the voice data in the each cluster.

In some embodiments, the apparatus further comprises: a second acquiring unit, configured to acquire the relevant information of the voice data; and the matching unit comprising: a selecting module, configured to select a registered voiceprint vector according to a matching degree between the relevant information of the voice data and the relevant information of the each registered voiceprint vector; and a matching module, configured to match the voiceprint characteristic vector with the selected registered voiceprint vector.

In some embodiments, the apparatus further comprises: a second determining unit, configured to determine whether the matching degree is greater than or equal to a preset success threshold; and an executing unit, configured to determine that the user is succeeded in authentication and execute an operation corresponding to the succeeded authentication in response to determining that the matching degree is greater than or equal to the preset success threshold.

According to the method and apparatus for processing voice data provided by the present disclosure, a voiceprint characteristic vector in voice data sent by a user terminal is extracted, the voiceprint characteristic vector is matched with a pre-generated registered voiceprint vector of the user, and the registered voiceprint vector is updated by using the voiceprint characteristic vector and the voice data when a matching degree is greater than or equal to a preset update threshold. In this way, the voice data of the user may be efficiently utilized, and accuracy of the registered voiceprint vector of the user may be enhanced.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
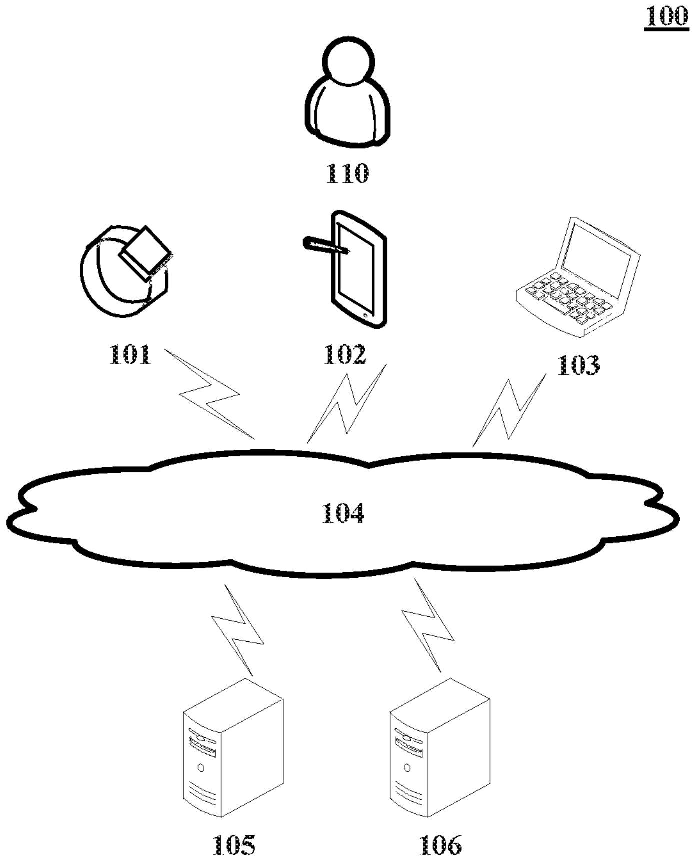
FIG. 1 is an exemplary architecture diagram of a system to which the present disclosure may be applied.

FIG. 1 shows an exemplary architecture of a system 100 which may be used by a method and apparatus for processing voice data according to an embodiment of the present application.

As shown in FIG. 1, the system architecture 100 may include terminal devices 101, 102 and 103, a network 104 and servers 105 and 106. The network 104 serves as a medium providing a communication link between the terminal devices 101, 102 and 103 and the servers 105 and 106. The network 104 may include various types of connections, such as wired or wireless transmission links, or optical fibers.

The user may use the terminal devices 101, 102 and 103 to interact with the servers 105, 106 through the network 104, in order to transmit or receive messages, etc. Various communication client applications, such as shopping applications, search applications, web browser applications, instant messaging tools, mailbox clients, social platform software, and payment applications may be installed on the terminal devices 101, 102 and 103.

The terminal devices 101, 102 and 103 may be various electronic devices having display screens and microphone, supporting data receiving and sending, including but not limited to, smart phones, tablet computers, smart watches, laptop computers and desktop computers.

The servers 105 and 106 may be servers providing various services, for example, servers in the backend providing support for the voice data sent from the terminal devices 101, 102 or 103. The backend servers may perform processing such as analyzing to the received voice data, and return a processing result to the terminal devices.

It should be noted that the method for processing the voice data according to the embodiments of the present application is generally executed by the servers 105 and 106, and accordingly, the apparatus for processing the voice data is generally installed in the servers 105 and 106.

It should be appreciated that the numbers of the terminal devices, the networks and the virtual machines in the virtual machine cluster in FIG. 1 are merely illustrative. Any number of terminal devices, networks and virtual machines may be provided based on the actual requirements.

Figure 2:
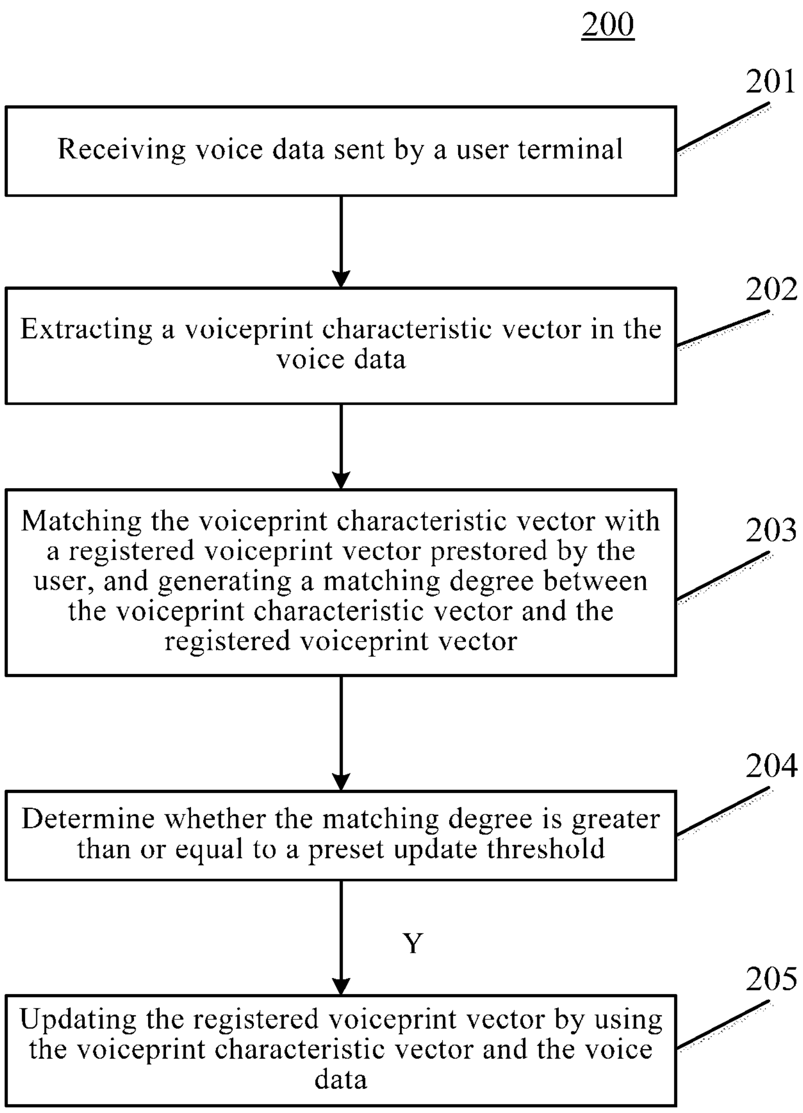
FIG. 2 is a flowchart of a method for processing voice data according to an embodiment of the present disclosure.

Continuing referring to FIG. 2, a flow 200 of a method for processing voice data according to an embodiment of the present disclosure is illustrated. The method for processing voice data comprises following steps.

Step 201: receiving voice data sent by a user terminal.

In this embodiment, an electronic device (such as servers as shown in FIG. 1) on which the method for processing voice data runs may receive, by way of wired connection or wireless connection, voice data from a terminal used by the user for user authentication. The voice data may be reading information generated by reading, by the user, according to a character string generated by the electronic device. The character string may be a character string randomly generated by the electronic device, or may be a character string selected in a character string set when the user registers a system account used for authentication. It should be noted that the above wireless connection manner may comprise but not limited to 3G/4G connection, WiFi connection, Bluetooth connection, WiMAX connection, Zigbee connection, ultra wideband (UWB) connection and other present known or future developed wireless connection manners.

Step 202: extracting a voiceprint characteristic vector in the voice data.

In this embodiment, the electronic device may extract the voiceprint characteristic vector in the voice data received in Step 201. The voiceprint is a sound wave spectrum carrying verbal information displayed by an electro acoustical instrument. Modern scientific researches show that the voiceprint is characterized by specificity and relative stability. The voiceprint characteristic vector may be a vector for identifying a voiceprint spectrum characteristic of the user.

In some optional implementations of this embodiment, the electronic device may import the voice data into a pre-trained universal background model (UBM) for mapping to obtain an intermediate vector, and then perform a characteristic transformation on the intermediate vector to obtain the voiceprint characteristic vector. No matter user authentication is succeeded or failed, compared with other models emphasizing on individual specificity, the universal background model is a model emphasizing on generality and individual universality in a biological recognition and authentication system. For example, in a user voice authentication system, the universal background model is a Gaussian Mixture Model (GMM) that is obtained by training a large number of voice samples of different gender-balanced speakers and is unrelated to the speakers, and the universal background model may be used for representing a corresponding relationship between voice data and an intermediate vector. Characteristic transformation may be carried out on the intermediate vector by means of Joint Factor Analysis (JFA) to obtain a voiceprint characteristic vector. As an effective algorithm aiming at channel compensation in a voiceprint authentication algorithm, the JFA is used for estimating a channel factor by assuming that speaker space and channel space are independent and by describing with two low-dimension factor spaces respectively. Alternatively, characteristic transformation may be carried out on the intermediate vector by means of Probabilistic Linear Discriminant Analysis (PLDA) to obtain the voiceprint characteristic vector. The PLDA also is a channel compensation algorithm and is a Linear Discriminant Analysis (LDA) in the form of probability. Furthermore, characteristic transformation may be carried out on the intermediate vector by means of an Identifying Vector (I-Vector) to obtain the voiceprint characteristic vector.

Step 203: matching the voiceprint characteristic vector with a registered voiceprint vector prestored by the user, and generating a matching degree between the voiceprint characteristic vector and the registered voiceprint vector.

In this embodiment, the electronic device may match the voiceprint characteristic vector extracted in Step 202 with the registered voiceprint vector prestored by the user, and generate the matching degree between the voiceprint characteristic vector and the registered voiceprint vector. The prestored registered voiceprint vector may be a pre-generated registered voiceprint vector or may be an updated registered voiceprint vector. The registered voiceprint vector may be generated by the electronic device, or may be acquired, by the electronic device, from other devices having generated the registered voiceprint vector of the user. After extracting the voiceprint characteristic vector in the user voice data, the electronic device may first detect whether the registered voiceprint vector of the user has been stored on the device, and then match the voiceprint characteristic vector with the registered voiceprint vector when detecting that the registered voiceprint vector of the user has been stored on the device, or send a request for acquiring the registered voiceprint vector of the user to other devices when not detecting that the registered voiceprint vector of the user has been stored on the device. The electronic device may match the voiceprint characteristic vector with the registered voiceprint vector when receiving the registered voiceprint vector of the user sent by the other devices, or may generate the registered voiceprint vector of the user according to a plurality of voice data inputted when the user registers when not receiving the registered voiceprint vector of the user sent by the other devices. When calculating the matching degree between the voiceprint characteristic vector and the registered voiceprint vector, a Manhattan distance, or a Minkowski distance or a Cosine similarity may be adopted for calculating.

In some optional implementations of this embodiment, the above relevant information may comprise an acquisition device type of the voice data, such as mobile phones, computers and smart watches. The above relevant information may further comprise an input site of the voice data. The input sites may be divided, according to magnitude of ambient environment noise, into high-noise sites such as metros, shopping malls and entertainment venues, and low-noise sites such as libraries and classrooms. The electronic device may cluster, using a clustering algorithm, the voice data stored by the user to generate at least one cluster of the stored voice data, then acquire the voice data in each cluster and relevant information of the voice data, then regenerate each registered voiceprint vector of the user by using the voice data in each cluster, and generate relevant information of each registered voiceprint vector according to the relevant information of the voice data in the each cluster. Also referred to as a cluster class, the cluster refers to a plurality of classes comprising similar objects. A cluster generated by a cluster class is a set of a group of data objects, which are similar to objects in the same cluster but different from objects in other clusters. As an example, when the quantity of the voice data whose input site in one cluster is a high-noise site accounts for 80% of that of all the voice data in this cluster, input site information in relevant information of a registered voiceprint vector generated by utilizing the voice data in this cluster may be set as the high-noise site.

In some optional implementations of this embodiment, when the electronic device processes the voice data, relevant information of the voice data also may be acquired, later, a registered voiceprint vector is selected according to a matching degree between the relevant information of the voice data and relevant information of each registered voiceprint vector of the user. For example, when it is acquired that the input site of the voice data is a bar, the registered voiceprint vector whose relevant information contains a high-noise site may be selected. When it is acquired that the acquisition device of the voice data is a smart watch, the registered voiceprint vector whose relevant information contains the smart watch may be selected. Finally, the voiceprint characteristic vector is matched with the selected registered voiceprint vector to obtain a matching result.

Step 204: determining whether the matching degree is greater than or equal to a preset update threshold.

In this embodiment, the electronic device may compare the matching degree generated in Step 203 with a preset update threshold to determine whether the matching degree is greater than or equal to the update threshold, wherein the update threshold is dynamic and personalized, that is, different users correspond to different update thresholds. Setting of the update threshold is to store the voice data and the voiceprint vector in a preset proportion to allow the electronic device to update the registered voiceprint vector of the user according to the stored voice data and voiceprint characteristic vector. For example, when the preset proportion is 80%, the update threshold may allow the voice data accounting for 80% of total voice data inputted by the user to be stored.

Step 205: updating the registered voiceprint vector by using the voiceprint characteristic vector and the voice data in response to determining that the matching degree is greater than or equal to the preset update threshold.

In this embodiment, when determining that the matching degree is greater than or equal to the preset update threshold, the electronic device may utilize the voice data received in Step 201 and the voiceprint characteristic vector extracted in Step 202 to update the registered voiceprint vector of the user.

In some optional implementations of this embodiment, when it is determined that the matching degree is greater than or equal to the preset success threshold, the electronic device may determine that the user is succeeded in authentication and execute an operation corresponding to the succeeded authentication. For example, when the user conducts an authentication for logging into a website, a page indicating successful login may be returned to the user; or when the user conducts an operation of unlocking a coded lock, the coded lock may be unlocked.

Using the method provided by the above embodiment of the present disclosure, the voiceprint characteristic vector in the user voice data is matched with the registered voiceprint vector of the user, and then the registered voiceprint vector of the user is updated by using the voice data whose matching degree is greater than or equal to the update threshold and the voiceprint characteristic vector. In this way, the accuracy of the registered voiceprint vector of the user is enhanced.

Figure 3:
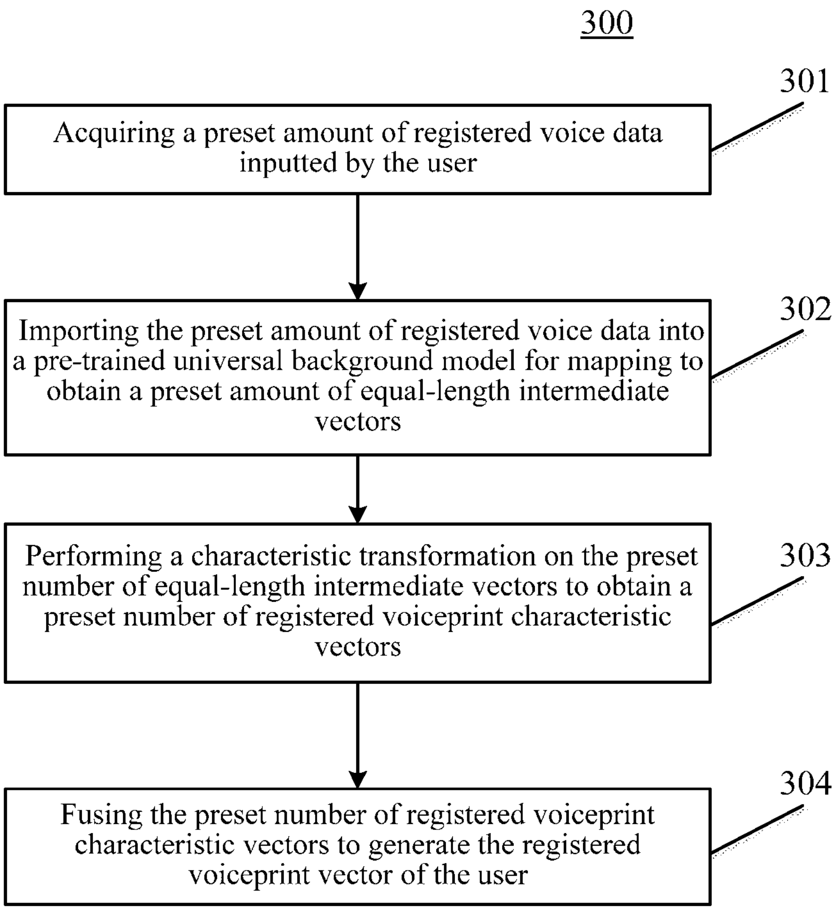
FIG. 3 is a flowchart of a method for generating a registered voiceprint vector of a user in Step 203 in FIG. 2 according to an implementation of the present disclosure.

Continuing referring to FIG. 3, which is a flow 300 of a method for generating a registered voiceprint vector of a user in Step 203 in FIG. 2 according to an implementation. The flow 300 for generating a registered voiceprint vector of a user comprises following steps.

Step 301: acquiring a preset amount of registered voice data inputted by the user.

In this embodiment, the electronic device (such as servers as shown in FIG. 1) on which the method for processing voice data runs may acquire a preset amount of registered voice data inputted when the user registers a system account used for authentication. The registered voice data may be reading information generated by reading, by the user, according to a character string generated by the electronic device. The character string may be a character string randomly generated by the electronic device, or may be a character string selected by the user in a character string set.

In some optional implementations of this embodiment, the electronic device may acquire voice data prestored by the user and relevant information of the voice data, wherein the relevant information comprises an input time point of the voice data. Next, the electronic device may delete voice data whose input time point is earlier than a preset time division point, determine the voice data after deletion as the registered voice data, and utilize the registered voice data to generate a registered voiceprint vector. As an example, when a preset time division point is Jun. 1, 2016, data whose input time point is earlier than Jun. 1, 2016 may be deleted.

In some optional implementations of this embodiment, the electronic device may first cluster the voice data prestored by the user utilizing a clustering algorithm to generate at least one cluster of the prestored voice data, wherein the clustering algorithm may comprise a partition-based clustering algorithm (such as k-means algorithm), a hierarchical-based clustering algorithm (such as balanced iterative reducing and clustering using hierarchies (BIRCH)) and a density-based clustering algorithm (such as DBSCAN algorithm). Next, the electronic device may acquire a center point of each cluster. Taking the k-means algorithm as an example, in the event that a K value and original center points of K clusters are given, each point is allocated to the cluster represented by the center point nearest to this point, after all the points are allocated, all the points in one cluster are recalculated (for example, an average value is calculated) to obtain the center point of this cluster, and then steps of allocating the points and updating the center point of the cluster are iteratively carried out until variation of the center point of the cluster is very small, or the center point of each cluster is acquired after an appointed number of iterations is reached. Next, a distance between each stored voice datum and the center point of the cluster where each stored voice datum is located is calculated by using a distance algorithm, wherein the distance algorithm may comprise an Euclidean distance algorithm. Finally, the voice data whose distance is greater than a preset distance threshold may be deleted, the voice data after deletion may be determined as the registered voice data, and the registered voiceprint vector may be generated by utilizing the registered voice data.

In some optional implementations of this embodiment, the electronic device may delete voice data whose input time point is earlier than the preset time division point and voice data whose distance is greater than the preset distance threshold, determine the voice data after deletion as the registered voice data, and utilize the registered voice data to generate the registered voiceprint vector.

Step 302: importing the preset amount of registered voice data into a pre-trained universal background model for mapping to obtain a preset number of equal-length intermediate vectors.

In this embodiment, the electronic device may import the preset amount of registered voice data into the pre-trained universal background model for mapping to obtain a preset number of equal-length intermediate vectors. The universal background model is a Gaussian mixture model that is obtained by training a large number of voice samples of different gender-balanced speakers and is unrelated to the speakers, and the universal background model may be used for representing a corresponding relationship between the voice data and the intermediate vector.

Step 303: performing a characteristic transformation on the preset number of equal-length intermediate vectors to obtain a preset number of registered voiceprint characteristic vectors.

In this embodiment, the electronic device may perform a characteristic transformation on the preset number of equal-length intermediate vectors according to the JFA, the PLDA and the I-Vector to obtain a preset number of registered voiceprint characteristic vectors.

Step 304: fusing the preset number of registered voiceprint characteristic vectors to generate the registered voiceprint vector of the user.

In this embodiment, the electronic device may fuse the preset number of registered voiceprint characteristic vectors to generate the registered voiceprint vector of the user. For example, when User A inputs K registered voice data in the registration process, K registered voiceprint characteristic vectors may be extracted, and the K registered voiceprint characteristic vectors may be fused according to the following Formula 1 to obtain the registered voiceprint vector of the user.

$$V = norm\left(\frac{1}{K}\sum_{i=1}^{K} norm(v_i)\right) \quad \text{(Formula 1)}$$

wherein V is the registered voiceprint vector of the user, K is the amount of registered voice data, $v_i$ is an $i^{th}$ registered voiceprint characteristic vector inputted by the user, norm ($v_i$) is a data standardization (length normalization) operation on $v_i$, and $$norm\left(\frac{1}{K}\sum_{i=1}^{K} norm(v_i)\right)$$

is a data standardization (length normalization) operation on $$\frac{1}{K}\sum_{i=1}^{K} norm(v_i).$$

Using the method for generating a registered voiceprint vector of a user according to the present disclosure, the registered voiceprint vector of the user is generated by mapping the registered voice data of the user, characteristic transformation and fusing, etc., so that an authentication result of the user is determined based on the registered voiceprint vector. In this way, an accurate user identity recognition is implemented.

Figure 4:
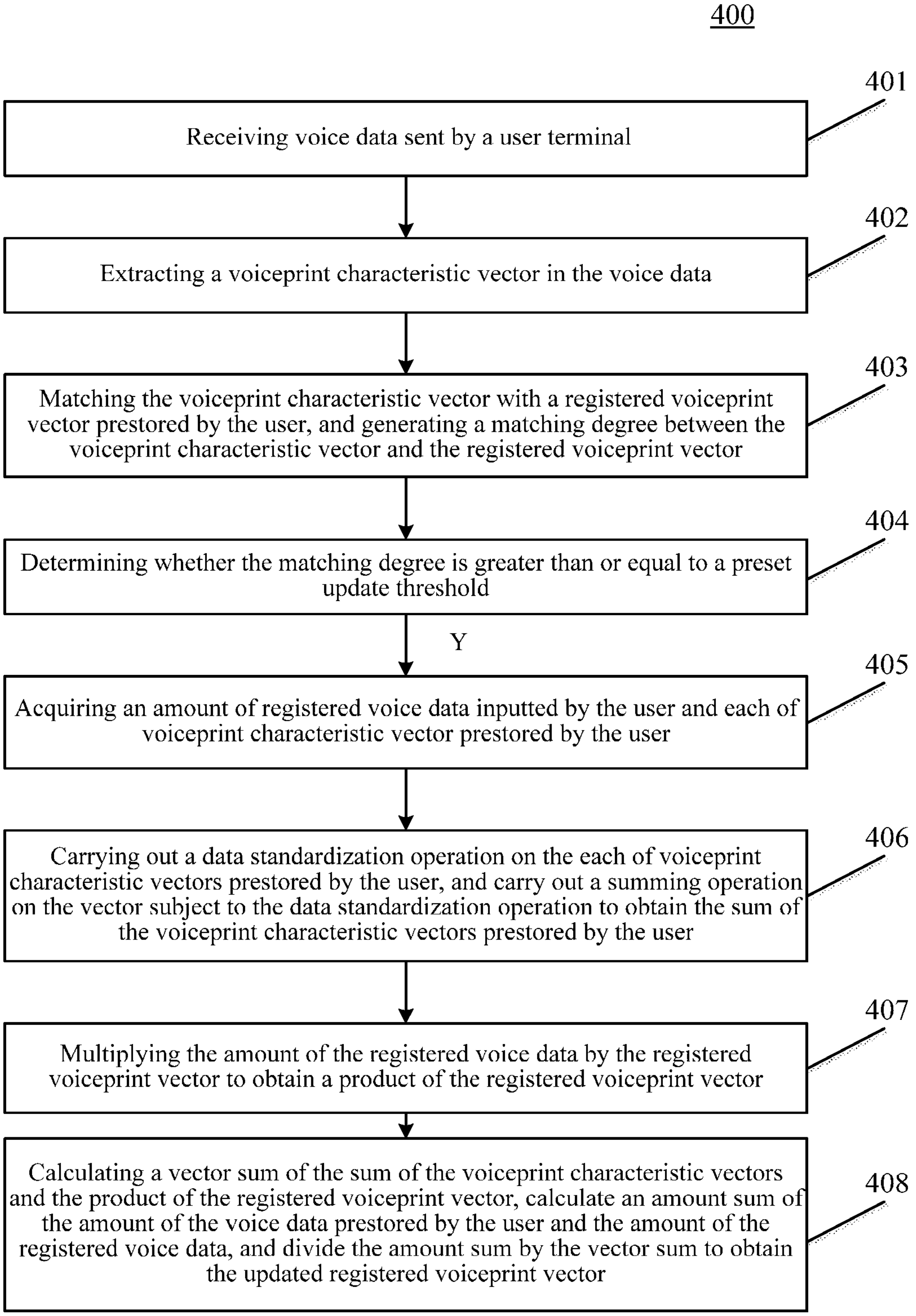
FIG. 4 is a flowchart of the method for processing voice data according to another embodiment of the present disclosure.

Further referring to FIG. 4, a flow 400 of the method for processing voice data according to still another embodiments is illustrated. The flow 400 of the method for processing voice data comprises following steps.

Step 401: receiving voice data sent by a user terminal.

In this embodiment, an electronic device (such as servers as shown in FIG. 1) on which the method for processing voice data runs may receive, by way of wired connection or wireless connection, voice data from a terminal on which user authentication is performed by a user by utilizing the electronic device. The voice data may be reading information generated by reading, by the user, according to a character string generated by the electronic device. The character string may be a character string randomly generated by the electronic device, or may be a character string selected in a character string set when the user registers a system account used for authentication.

Step 402: extracting a voiceprint characteristic vector in the voice data.

In this embodiment, the electronic device may extract the voiceprint characteristic vector in the voice data received in Step 401. The voiceprint is a sound wave spectrum carrying verbal information displayed by an electro acoustical instrument. Modern scientific researches show that the voiceprint is characterized by specificity and relative stability. The voiceprint characteristic vector may be a vector for identifying a voiceprint spectrum characteristic of the user.

Step 403: matching the voiceprint characteristic vector with a registered voiceprint vector prestored by the user, and generating a matching degree between the voiceprint characteristic vector and the registered voiceprint vector.

In this embodiment, the electronic device may match the voiceprint characteristic vector extracted in Step 402 with the registered voiceprint vector prestored by the user, and generate the matching degree between the voiceprint characteristic vector and the registered voiceprint vector. The prestored registered voiceprint vector may be a pre-generated registered voiceprint vector or may be an updated registered voiceprint vector. The registered voiceprint vector may be generated by the electronic device, or may be acquired, by the electronic device, from other devices having generated the registered voiceprint vector of the user. The matching degree between the voiceprint characteristic vector and the registered voiceprint vector may be calculated using the Manhattan Distance, the Minkowski Distance and the Cosine Similarity, etc.

Step 404: determining whether the matching degree is greater than or equal to a preset update threshold.

In this embodiment, the electronic device may compare the matching degree generated in Step 403 with a preset update threshold to determine whether the matching degree is greater than or equal to the update threshold, wherein the update threshold is dynamic and personalized, that is, different users correspond to different update thresholds. Setting of the update threshold is to store the voice data and the voiceprint vector in a preset proportion to allow the electronic device to update the registered voiceprint vector of the user according to the stored voice data and voiceprint characteristic vector. For example, when the preset proportion is 90%, the update threshold may allow the voice data accounting for 90% of total voice data inputted by the user to be stored.

In this embodiment, the electronic device may set different update thresholds for each registered voiceprint vector of the user. To match the voiceprint characteristic vector with the selected registered voiceprint vector, a comparison may be made between the obtained matching degree and the update threshold corresponding to the selected registered voiceprint vector, wherein the registered voiceprint vector corresponds, one to one, to the update threshold.

Step 405: acquiring the amount of registered voice data inputted by the user and each voiceprint characteristic vector prestored by the user in response to determining that the matching degree is greater than or equal to the preset update threshold.

In this embodiment, when determining that the matching degree is greater than or equal to the preset update threshold, the electronic device may acquire the amount of registered voice data inputted by the user and each voiceprint characteristic vector prestored by the user. After it is determined that the matching degree is greater than or equal to the preset update threshold, the electronic device may first acquire the amount of voice data prestored by the user, and also may acquire the amount of voice data whose status is marked as unused. Afterward, the electronic device may determine whether the acquired amount is greater than the preset amount threshold, wherein the amount threshold may be preset so that the registered voiceprint vector is updated when the amount of voice data prestored is greater than the amount threshold. When the amount is greater than the preset amount threshold or the preset time point is reached, the electronic device may acquire the amount of the registered voice data and each voiceprint characteristic vector prestored by the user.

Step 406: carrying out a data standardization operation on each voiceprint characteristic vector prestored by the user, and carrying out a summing operation on the vector subject to the data standardization operation to obtain the sum of the voiceprint characteristic vectors prestored by the user.

In this embodiment, the electronic device may carry out a data standardization operation (or length normalization operation) on each voiceprint characteristic vector prestored by the user, and carry out a summing operation on the vector subject to the data standardization operation to obtain the sum of the voiceprint characteristic vectors prestored by the user, wherein the data standardization processing mainly comprises data synchronously chemotactic processing and nondimensionalized processing. The data synchronously chemotactic processing mainly solves a problem of data with different properties. Directly totaling indexes with different properties cannot correctly reflect a comprehensive result of different acting forces, it is needed to first consider that inverse index data properties are changed so that the acting forces of all the indexes on an evaluation scheme are synchronously chemotactic, and then the indexes are totaled. Only in this way can a correct result be obtained. The data nondimensionalized processing mainly solves the problem of data comparability. There are many methods for data standardization, among which “minimum-maximum standardization”, “Z-score standardization”, “standardization by decimal scaling” and the like are commonly used.

Step 407: multiplying the amount of the registered voice data by the registered voiceprint vector to obtain a product of the registered voiceprint vector.

In this embodiment, the electronic device may multiply the amount of the registered voice data by the registered voiceprint vector to obtain a product of the registered voiceprint vector.

Step 408: calculating a vector sum of the sum of the voiceprint characteristic vectors and the product of the registered voiceprint vector, calculating an amount sum of the amount of the voice data prestored by the user and the amount of the registered voice data, and dividing the amount sum by the vector sum to obtain the updated registered voiceprint vector.

In this embodiment, the electronic device may calculate the vector sum of the sum of the voiceprint characteristic vectors obtained in Step 409 and the product of the registered voiceprint vector obtained in Step 410, calculate the amount sum of the amount of the voice data prestored by the user and the amount of the registered voice data, and divide the amount sum by the vector sum to obtain the updated registered voiceprint vector. Specifically, the updated registered voiceprint vector may be obtained according to the following Formula 2.

$$V_{new} = \frac{n * V + \sum_{i=1}^{K} norm(v_i)}{n + K} \quad \text{(Formula 2)}$$

wherein $V_{new}$ is the updated registered voiceprint vector, n is the amount of the registered voice data, V is the registered voiceprint vector, K is the amount of prestored voice data $v_i$, $norm(v_i)$ is an $i^{th}$ prestored voiceprint characteristic vector, and $v_i$ is operation on data standardization (length normalization).

In some optional implementations of this embodiment, when the K in Formula 2 is 1, the registered voiceprint vector may be updated in real time online.

In some optional implementations of this embodiment, after updating the registered voiceprint vector, the electronic device may delete the voice data prestored by the user, or mark the status thereof as used so as to avoid these used voice data being repeatedly used for updating.

As can be seen from FIG. 4, compared with the embodiment corresponding to FIG. 2, the flow 400 of the method for processing voice data in this embodiment highlights the specific step of updating the registered voiceprint vector. As thus, according to the scheme as described in this embodiment, the registered voiceprint vector of the user may be updated using the voice data inputted when the user registers and the voice data whose matching degree is greater than or equal to the preset update threshold. In this way, more accurate registered voiceprint vector may be obtained.

Figure 5:
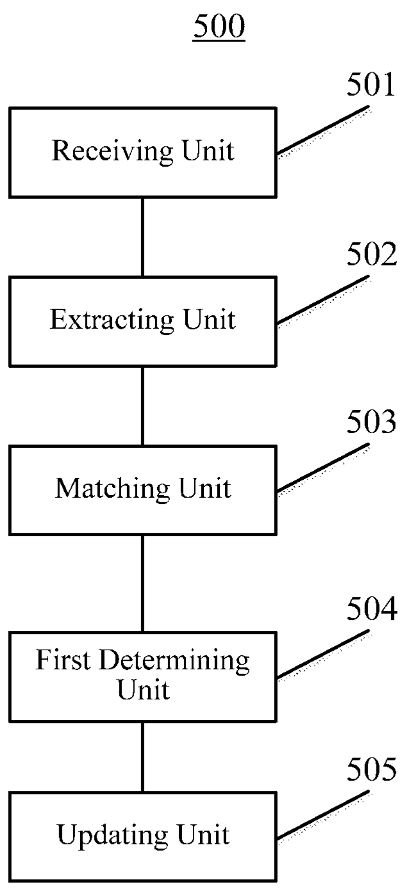
FIG. 5 is a schematic structural diagram of an apparatus for processing voice data according to an embodiment of the present disclosure.

Further referring to FIG. 5, as an implementation of the method as shown in the foregoing figures, the present disclosure provides an embodiment of an apparatus for processing voice data. The apparatus embodiment corresponds to the method embodiment as shown in FIG. 2, and the apparatus specifically may be used in various electronic devices.

As shown in FIG. 5, the apparatus 500 for processing voice data of this embodiment includes: a receiving unit 501, an extracting unit 502, a matching unit 503, a first determining unit 504 and an updating unit 505. The receiving unit 501 is configured to receive voice data sent by a user terminal. The extracting unit 502 is configured to extract a voiceprint characteristic vector in the voice data. The matching unit 503 is configured to match the voiceprint characteristic vector with a registered voiceprint vector prestored by the user, and generate a matching degree between the voiceprint characteristic vector and the registered voiceprint vector. The first determining unit 504 is configured to determine whether the matching degree is greater than or equal to a preset update threshold. The updating unit 505 is configured to update the registered voiceprint vector by using the voiceprint characteristic vector and the voice data in response to determining that the matching degree is greater than or equal to the preset update threshold.

In this embodiment, the receiving unit 501 of the apparatus 500 for processing voice data may receive, by way of wired connection or wireless connection, voice data from a terminal used by the user for user authentication, wherein the voice data may be reading information generated by reading, by the user, according to a character string generated by the electronic device. The character string may be a character string randomly generated by the electronic device, or may be a character string selected in a character string set when the user registers a system account used for authentication.

In this embodiment, the extracting unit 502 may extract the voiceprint characteristic vector in the voice data based on the voice data received by the receiving unit 501. The voiceprint is a sound wave spectrum carrying verbal information displayed by an electroacoustical instrument. Modern scientific researches show that the voiceprint is characterized by specificity and relative stability. The voiceprint characteristic vector may be a vector for identifying a voiceprint spectrum characteristic of the user.

In this embodiment, based on the voiceprint characteristic vector extracted by the extracting unit 502, the matching unit 503 may match the voiceprint characteristic vector with the registered voiceprint vector prestored by the user, and generate a matching degree between the voiceprint characteristic vector and the registered voiceprint vector. The prestored registered voiceprint vector may be a pre-generated registered voiceprint vector or may be an updated registered voiceprint vector. The registered voiceprint vector may be generated by the electronic device, or may be acquired, by the electronic device, from other devices having generated the registered voiceprint vector of the user. The matching unit 503 may calculate the matching degree between the voiceprint characteristic vector and the registered voiceprint vector using the Manhattan Distance, the Minkowski Distance and the Cosine Similarity.

In this embodiment, based on the matching degree generated by the matching unit 503, the first determining unit 504 may compare the matching degree with a preset update threshold to determine whether the matching degree is greater than or equal to the update threshold, wherein the update threshold is dynamic and personalized, that is, different users correspond to different update thresholds. Setting of the update threshold is to store the voice data and the voiceprint vector in a preset proportion to allow the electronic device to update the registered voiceprint vector of the user according to the stored voice data and voiceprint characteristic vector.

In this embodiment, when determining that the matching degree is greater than or equal to the preset update threshold, the updating unit 505 may utilize the voice data received from the receiving unit 501 and the voiceprint characteristic vector extracted from the extracting unit 502 to update the registered voiceprint vector of the user.

In some optional implementations of this embodiment, the extracting unit 502 may comprise a mapping module (not shown in the figure) and a transforming module (not shown in the figure). The mapping module may import the voice data into a pre-trained universal background model for mapping to obtain an intermediate vector, and then the transforming module may perform a characteristic transformation on the intermediate vector to obtain the voiceprint characteristic vector. In a user voice authentication system, the universal background model is a Gaussian mixture model that is obtained by training a large number of voice samples of different gender-balanced speakers and is unrelated to the speakers, and the universal background model may be used for representing a corresponding relationship between the voice data and the intermediate vector.

In some optional implementations of this embodiment, the apparatus 500 for processing voice data may further comprise a generating unit (not shown in the figure). The generating unit may comprise an acquiring module (not shown in the figure), a mapping module (not shown in the figure), a transforming module (not shown in the figure) and a fusing module (not shown in the figure). The acquiring module may acquire a preset amount of registered voice data inputted when the user registers a system account used for authentication, wherein the voice data may be reading information generated by reading, by the user, according to a character string generated by the electronic device. The mapping module may import the preset amount of registered voice data into a pre-trained universal background model for mapping to obtain a preset number of equal-length intermediate vectors, wherein the universal background model is a Gaussian mixture model that is obtained by training a large number of voice samples of different gender-balanced speakers and is unrelated to the speakers, and the universal background model may be used for representing a corresponding relationship between the voice data and the intermediate vector. The transforming module may perform a characteristic transformation on the preset number of equal-length intermediate vectors according to JFA, PLDA, I-Vector and other algorithms to obtain a preset number of registered voiceprint characteristic vectors. The fusing module may fuse the preset number of registered voiceprint characteristic vectors to generate the registered voiceprint vector of the user.

In some optional implementations of this embodiment, the updating unit 505 may further comprise an acquiring module (not shown in the figure) and an updating module (not shown in the figure). The acquiring module may acquire the amount of the registered voice data and each voiceprint characteristic vector prestored by the user. The updating module may update the registered voiceprint vector according to each voiceprint characteristic vector prestored by the user, the amount of voice data prestored by the user, the amount of the registered voice data and the registered voiceprint vector.

In some optional implementations of this embodiment, the updating module may comprise a first calculating submodule (not shown in the figure), a second calculating submodule (not shown in the figure) and an updating submodule (not shown in the figure). The first calculating submodule may carry out a data standardization operation on each voiceprint characteristic vector prestored by the user, and carry out a summing operation on the vector subject to the data standardization operation to obtain the sum of the voiceprint characteristic vectors prestored by the user. The second calculating submodule may multiply the amount of the registered voice data by the registered voiceprint vector to obtain a product of the registered voiceprint vector. The updating submodule may calculate a vector sum of the sum of the voiceprint characteristic vectors obtained by the first calculating submodule and the product of the registered voiceprint vector obtained by the second calculating sub-module, calculate an amount sum of the amount of the voice data prestored by the user and the amount of the registered voice data, and divide the amount sum by the vector sum to obtain the updated registered voiceprint vector.

In some optional implementations of this embodiment, after updating the registered voiceprint vector, the updating unit may delete the voice data prestored by the user, or mark the status thereof as used so as to avoid these used voice data being repeatedly used for updating.

In some optional implementations of this embodiment, the acquiring module may comprise a first acquiring submodule (not shown in the figure) and a first deleting submodule (not shown in the figure). The first acquiring submodule may acquire the voice data prestored by the user and relevant information of the voice data, wherein the relevant information comprises an input time point of the voice data. Next, the first deleting submodule may delete voice data whose input time point is earlier than a preset time division point, determine the voice data after deletion as the registered voice data, and utilize the registered voice data to generate the registered voiceprint vector.

In some optional implementations of this embodiment, the acquiring module may further comprise a generating submodule (not shown in the figure), a second acquiring submodule (not shown in the figure), a calculating submodule (not shown in the figure) and a second deleting submodule (not shown in the figure). The generating submodule may cluster the voice data prestored by the user utilizing a clustering algorithm to generate at least one cluster of the prestored voice data, wherein the clustering algorithm may comprise a partition-based clustering algorithm, a hierarchical-based clustering algorithm, a density-based clustering algorithm and the like. Next, the second acquiring submodule may acquire a center point of each cluster. Taking the k-means algorithm as an example, in the event that a K value and original center points of K clusters are given, each point is allocated to the cluster represented by the center point nearest to this point, after all the points are allocated, all the points in one cluster are recalculated (for example, an average value is calculated) to obtain the center point of this cluster, and then steps of allocating the points and updating the center point of the cluster are iteratively carried out until variation of the center point of the cluster is very small, or the center point of each cluster is acquired after an appointed number of iterations is reached. Next, a distance between each stored voice datum and the center point of the cluster where each stored voice datum is located is calculated by using a distance algorithm, wherein the distance algorithm may comprise an Euclidean distance algorithm. Finally, the second deleting submodule may delete the voice data whose distance is greater than a preset distance threshold, determine the voice data after deletion as the registered voice data, and utilize the registered voice data to generate the registered voiceprint vector.

In some optional implementations of this embodiment, the above relevant information may comprise an acquisition device type of the voice data, such as mobile phones, computers and smart watches. The above relevant information may further comprise an input site of the voice data. The input sites may be divided, according to magnitude of ambient environment noise, into high-noise sites such as metros, shopping malls and entertainment venues, and low-noise sites such as libraries and classrooms. The apparatus 500 for processing voice data may further comprise a first acquiring unit (not shown in the figure) and a regenerating unit (not shown in the figure). The first acquiring unit may acquire the voice data in each cluster and relevant information of the voice data. Next, the regenerating unit may regenerate each registered voiceprint vector of the user by using the voice data of each cluster, and generate relevant information of each registered voiceprint vector according to the relevant information of the voice data of each cluster.

In some optional implementations of this embodiment, the apparatus 500 for processing voice data may further comprise a second acquiring unit (not shown in the figure). When processing voice data, the second acquiring unit may acquire the relevant information of the voice data. The matching unit 503 may further comprise a selecting module (not shown in the figure) and a matching module (not shown in the figure). The selecting module may select a registered voiceprint vector according to a matching degree between the relevant information of the voice data and the relevant information of each registered voiceprint vector of the user. For example, when it is acquired that the input site of the voice data is a bar, the registered voiceprint vector whose relevant information contains a high-noise site may be selected. When it is acquired that the acquisition device of the voice data is a smart watch, the registered voiceprint vector whose relevant information contains the smart watch may be selected. Finally, the matching module may match the voiceprint characteristic vector with the selected registered voiceprint vector to obtain a matching result.

In some optional implementations of this embodiment, the apparatus 500 for processing voice data may further comprise a second determining unit (not shown in the figure) and an executing unit (not shown in the figure). When the second determining unit determines that the matching degree is greater than or equal to the preset update threshold, the executing unit may determine that the user is succeeded in authentication and execute an operation corresponding to the succeeded authentication. For example, when the user conducts an authentication for logging into a website, a page indicating successful login may be returned to the user; or when the user conducts an operation of unlocking a coded lock, the coded lock may be unlocked.

Figure 6:
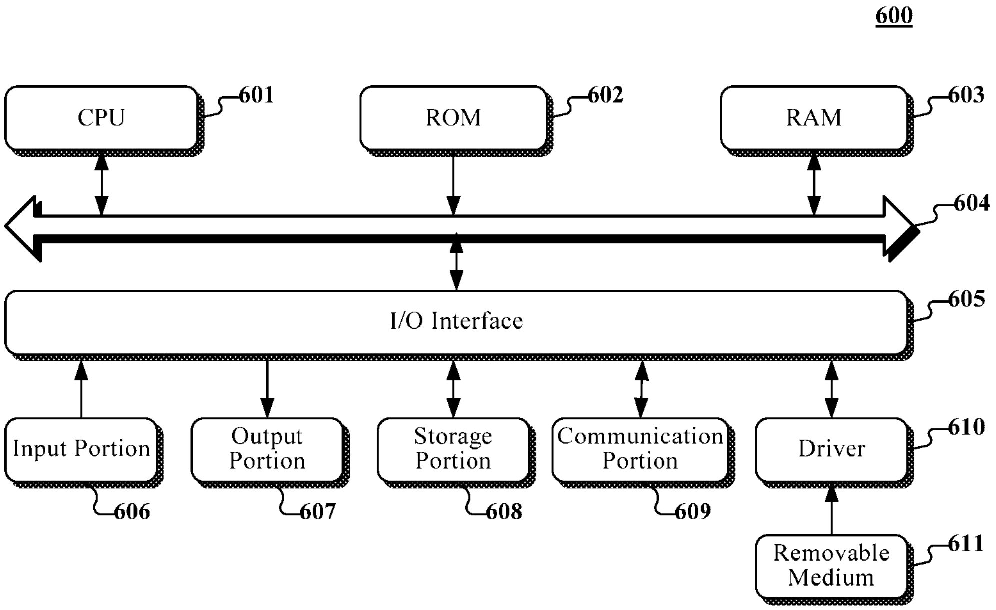
FIG. 6 illustrates a structural schematic diagram of a computer system adapted to implement a server of the embodiments of the present disclosure.

Referring to FIG. 6, a schematic structural diagram of a computer system 600 adapted to implement a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present disclosure may be implemented by way of software or hardware. The described units may also be provided in a processor, for example, described as: a processor, comprising a receiving unit, an extracting unit, a matching unit, a first determining unit and an updating unit, where the names of these units are not considered as a limitation to the units. For example, the receiving unit may also be described as "a unit for receiving voice data sent by a user terminal".

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into a terminal. The non-volatile computer storage medium stores one or more programs. The one or more programs, when executed by a device, cause the device to: receive voice data sent by a user terminal; extract a voiceprint characteristic vector in the voice data; match the voiceprint characteristic vector with a registered voiceprint vector prestored by the user, and generate a matching degree between the voiceprint characteristic vector and the registered voiceprint vector; determine whether the matching degree is greater than or equal to a preset update threshold; and update the registered voiceprint vector by using the voiceprint characteristic vector and the voice data in response to determining that the matching degree is greater than or equal to the preset update threshold.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for processing voice data, comprising:

receiving voice data sent by a user terminal;

extracting a voiceprint characteristic vector in the voice data;

matching the voiceprint characteristic vector with a registered voiceprint vector prestored by the user, and generating a matching degree between the voiceprint characteristic vector and the registered voiceprint vector;

determining whether the matching degree is greater than or equal to a preset update threshold; and updating the registered voiceprint vector by using the voiceprint characteristic vector and the voice data in response to determining that the matching degree is greater than or equal to the preset update threshold;

wherein before the matching the voiceprint characteristic vector with a registered voiceprint vector prestored by the user, the method further comprises generating the registered voiceprint vector, comprising:

acquiring a preset amount of registered voice data inputted by the user;

importing the preset amount of registered voice data into a pre-trained universal background model for mapping to obtain a preset number of equal-length intermediate vectors;

performing a characteristic transformation on the preset number of equal-length intermediate vectors to obtain a preset number of registered voiceprint characteristic vectors; and fusing the preset number of registered voiceprint characteristic vectors to generate the registered voiceprint vector of the user; and wherein the acquiring the preset amount of registered voice data inputted by the user comprises:

generating at least one cluster of the stored voice data by clustering the voice data stored by the user by using a clustering algorithm;

acquiring a center point of each cluster;

calculating a distance between each of the stored voice data and the center point of the cluster where the each of the stored voice data is by using a distance algorithm; and deleting the voice data whose distance is greater than a preset distance threshold, and determining the voice data after deletion as the registered voice data.

2. The method according to claim 1, wherein the extracting a voiceprint characteristic vector in the voice data comprises:

importing the voice data into a pre-trained universal background model for mapping to obtain an intermediate vector;

performing a characteristic transformation on the intermediate vector to obtain the voiceprint characteristic vector.

3. The method according to claim 1, wherein the updating the registered voiceprint vector by using the voiceprint characteristic vector and the voice data comprises:

acquiring an amount of registered voice data inputted by the user and each of voiceprint characteristic vectors prestored by the user; and updating the registered voiceprint vector according to the each of voiceprint characteristic vectors prestored by the user, an amount of voice data prestored by the user, an amount of the registered voice data and the registered voiceprint vector.

4. The method according to claim 3, wherein the updating the registered voiceprint vector according to the each of voiceprint characteristic vectors prestored by the user, the amount of voice data prestored by the user, the amount of the registered voice data and the registered voiceprint vector comprises:

carrying out a data standardization operation on the each of voiceprint characteristic vectors prestored by the user, and carrying out a summing operation on the vector subject to the data standardization operation to obtain the sum of the voiceprint characteristic vectors prestored by the user;

multiplying the amount of the registered voice data by the registered voiceprint vector to obtain a product of the registered voiceprint vector; and calculating a vector sum of the sum of the voiceprint characteristic vectors and the product of the registered voiceprint vector, calculating an amount sum of the amount of the voice data prestored by the user and the amount of the registered voice data, and dividing the amount sum by the vector sum to obtain the updated registered voiceprint vector.

5. The method according to claim 3, wherein after the updating the registered voiceprint vector, the method comprises:

deleting the voice data prestored by the user.

6. The method according to claim 1, wherein the acquiring the preset amount of registered voice data inputted by the user further comprises:

acquiring the voice data prestored by the user and relevant information of the voice data, the relevant information comprising an input time point of the voice data;

deleting voice data having the input time point earlier than a preset time division point, and determining the voice data after deletion as the registered voice data.

7. The method according to claim 1, wherein the relevant information further comprises at least one of: an acquisition device type of the voice data and an input site of the voice data; and after the generating at least one cluster of the stored voice data, the method further comprises:

acquiring voice data in each cluster and relevant information of the voice data in the each cluster; and regenerating each registered voiceprint vector of the user by using the voice data in the each cluster, and generating relevant information of the each registered voiceprint vector according to the relevant information of the voice data in the each cluster.

8. The method according to claim 7, wherein after the receiving voice data sent by a user terminal, the method further comprises:

acquiring the relevant information of the voice data; and the matching the voiceprint characteristic vector with the registered voiceprint vector of the user comprises:

selecting a registered voiceprint vector according to a matching degree between the relevant information of the voice data and the relevant information of the each registered voiceprint vector; and matching the voiceprint characteristic vector with the selected registered voiceprint vector.

9. The method according to claim 1, wherein after the generating a matching degree between the voiceprint characteristic vector and the registered voiceprint vector, the method further comprises:

determining whether the matching degree is greater than or equal to a preset success threshold; and determining, in response to determining the matching degree being greater than or equal to the preset success threshold, that a succeeded authentication of the user is success, and executing an operation corresponding to the succeeded authentication.

10. An apparatus for processing voice data, comprising:

at least one processor; and a memory storing instructions, which when executed by the at least one processor, cause the at least one processor to perform operations, the operations comprising:

receiving voice data sent by a user terminal;

extracting a voiceprint characteristic vector in the voice data;

matching the voiceprint characteristic vector with a registered voiceprint vector prestored by the user, and generating a matching degree between the voiceprint characteristic vector and the registered voiceprint vector;

determining whether the matching degree is greater than or equal to a preset update threshold; and updating the registered voiceprint vector by using the voiceprint characteristic vector and the voice data in response to determining that the matching degree is greater than or equal to the preset update threshold;

wherein before the matching the voiceprint characteristic vector with a registered voiceprint vector prestored by the user, the operations further comprise generating the registered voiceprint vector, comprising:

acquiring a preset amount of registered voice data inputted by the user;

importing the preset amount of registered voice data into a pre-trained universal background model for mapping to obtain a preset number of equal-length intermediate vectors;

performing a characteristic transformation on the preset number of equal-length intermediate vectors to obtain a preset number of registered voiceprint characteristic vectors; and fusing the preset number of registered voiceprint characteristic vectors to generate the registered voiceprint vector of the user; and wherein the acquiring the preset amount of registered voice data inputted by the user comprises:

generating at least one cluster of the stored voice data by clustering the voice data stored by the user by using a clustering algorithm;

acquiring a center point of each cluster;

calculating a distance between each of the stored voice data and the center point of the cluster where the each of the stored voice data is by using a distance algorithm; and deleting the voice data whose distance is greater than a preset distance threshold, and determining the voice data after deletion as the registered voice data.

11. The apparatus according to claim 10, wherein the extracting a voiceprint characteristic vector in the voice data comprises:

a mapping module, configured to import the voice data into a pre-trained universal background model for mapping to obtain an intermediate vector;

a transforming module, configured to perform a characteristic transformation on the intermediate vector to obtain the voiceprint characteristic vector.

12. The apparatus according to claim 10, wherein the updating the registered voiceprint vector by using the voiceprint characteristic vector and the voice data comprises:

acquiring an amount of registered voice data inputted by the user and each of voiceprint characteristic vector prestored by the user; and updating the registered voiceprint vector according to the each of voiceprint characteristic vectors prestored by the user, an amount of voice data prestored by the user, an amount of the registered voice data and the registered voiceprint vector.

13. The apparatus according to claim 12, wherein the updating the registered voiceprint vector according to the each of voiceprint characteristic vectors prestored by the user, the amount of voice data prestored by the user, the amount of the registered voice data and the registered voiceprint vector comprises:

carrying out a data standardization operation on the each of voiceprint characteristic vectors prestored by the user, and carry out a summing operation on the vector subject to the data standardization operation to obtain the sum of the voiceprint characteristic vectors prestored by the user;

multiplying the amount of the registered voice data by the registered voiceprint vector to obtain a product of the registered voiceprint vector; and calculating a vector sum of the sum of the voiceprint characteristic vectors and the product of the registered voiceprint vector, calculate an amount sum of the amount of the voice data prestored by the user and the amount of the registered voice data, and divide the amount sum by the vector sum to obtain the updated registered voiceprint vector.

14. The apparatus according to claim 12, the operations further comprising:

deleting the voice data prestored by the user.

15. The apparatus according to claim 10, wherein the acquiring the preset amount of registered voice data inputted by the user further comprises:

acquiring the voice data prestored by the user and relevant information of the voice data, the relevant information comprising an input time point of the voice data;

deleting voice data having the input time point is earlier than a preset time division point, and determine the voice data after deletion as the registered voice data.

16. The apparatus according to claim 10, wherein the relevant information further comprises at least one of: an acquisition device type of the voice data and an input site of the voice data; and the operations further comprising:

acquiring voice data in each cluster and relevant information of the voice data in the each cluster; and regenerating each registered voiceprint vector of the user by using the voice data in the each cluster, and generate relevant information of the each registered voiceprint vector according to the relevant information of the voice data in the each cluster.

17. The apparatus according to claim 16, the operations further comprising:

acquiring the relevant information of the voice data; and the matching unit comprising:

selecting a registered voiceprint vector according to a matching degree between the relevant information of the voice data and the relevant information of the each registered voiceprint vector; and matching the voiceprint characteristic vector with the selected registered voiceprint vector.

18. The apparatus according to claim 10, the operations further comprising:

determining whether the matching degree is greater than or equal to a preset success threshold; and determining, in response to determining the matching degree being greater than or equal to the preset success threshold, that a succeeded authentication of the user is success, and executing an operation corresponding to the succeeded authentication.

19. A non-transitory computer storage medium storing a computer program, which when executed by one or more processors, cause the one or more processors to perform operations, the operations comprising:

receiving voice data sent by a user terminal;

extracting a voiceprint characteristic vector in the voice data;

matching the voiceprint characteristic vector with a registered voiceprint vector prestored by the user, and generating a matching degree between the voiceprint characteristic vector and the registered voiceprint vector;

determining whether the matching degree is greater than or equal to a preset update threshold; and updating the registered voiceprint vector by using the voiceprint characteristic vector and the voice data in response to determining that the matching degree is greater than or equal to the preset update threshold;

wherein before the matching the voiceprint characteristic vector with a registered voiceprint vector prestored by the user, the operations further comprise generating the registered voiceprint vector, comprising:

acquiring a preset amount of registered voice data inputted by the user;

importing the preset amount of registered voice data into a pre-trained universal background model for mapping to obtain a preset number of equal-length intermediate vectors;

performing a characteristic transformation on the preset number of equal-length intermediate vectors to obtain a preset number of registered voiceprint characteristic vectors; and fusing the preset number of registered voiceprint characteristic vectors to generate the registered voiceprint vector of the user; and wherein the acquiring the preset amount of registered voice data inputted by the user comprises:

generating at least one cluster of the stored voice data by clustering the voice data stored by the user by using a clustering algorithm;

acquiring a center point of each cluster;

calculating a distance between each of the stored voice data and the center point of the cluster where the each of the stored voice data is by using a distance algorithm; and deleting the voice data whose distance is greater than a preset distance threshold, and determining the voice data after deletion as the registered voice data.

* * * * *